H. HENTZELL.
ELECTRIC MOTOR HAVING IMPROVED SIDE FRAMES.
APPLICATION FILED OCT. 31, 1917.

1,326,502.

Patented Dec. 30, 1919.
2 SHEETS—SHEET 1.

Inventor
Hervey Hentzell
by Jay A. Mathews,
Atty

H. HENTZELL.
ELECTRIC MOTOR HAVING IMPROVED SIDE FRAMES.
APPLICATION FILED OCT. 31, 1917.
1,326,502.
Patented Dec. 30, 1919.
2 SHEETS—SHEET 2.
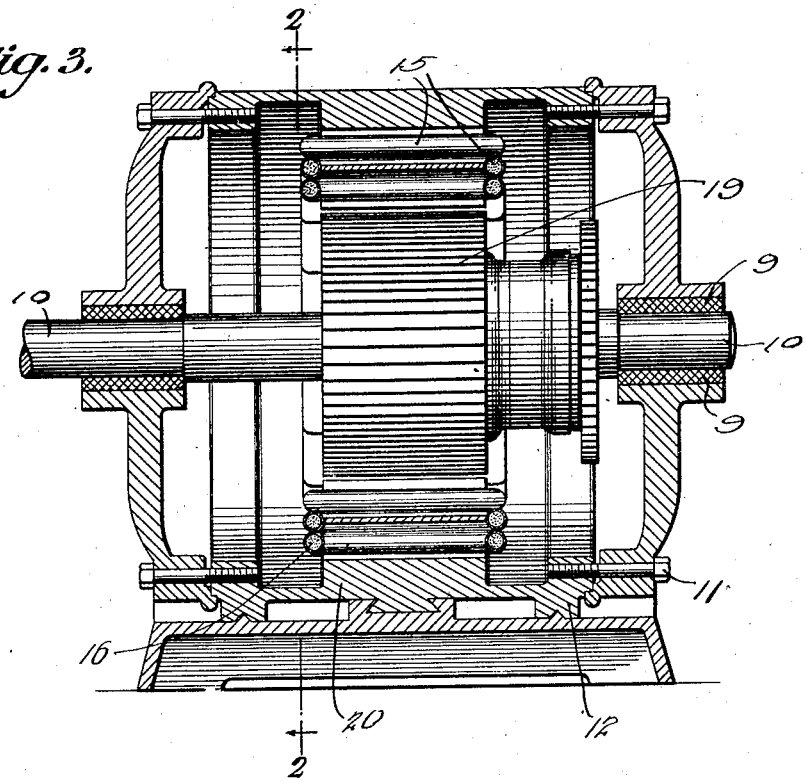
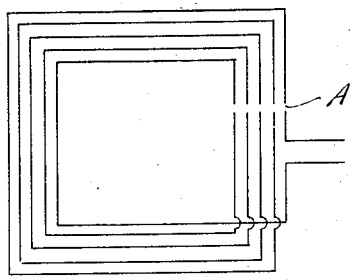
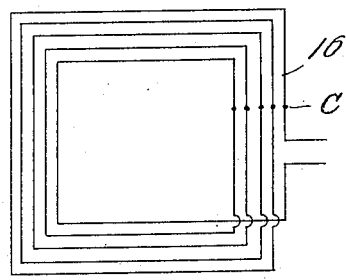
Inventor
Hervey Hentzell
by Jerry A. Mathews
atty

UNITED STATES PATENT OFFICE.

HERVEY HENTZELL, OF GARY, INDIANA.

ELECTRIC MOTOR HAVING IMPROVED SIDE FRAMES.

1,326,502.   Specification of Letters Patent.   Patented Dec. 30, 1919.

Application filed October 31, 1917. Serial No. 199,522.

*To all whom it may concern:*

Be it known that I, HERVEY HENTZELL, a citizen of the United States, residing at Gary, in the county of Lake and State of Indiana, have invented a new and useful Electric Motor Having Improved Side Frames, of which the following is a specification.

The object of my invention is to provide an improved electric motor so constructed as to permit of readily changing coils without taking the entire machine apart, and to provide a novel combination and arrangement of parts hereinafter claimed and illustrated in the accompanying drawings in which:—

Fig. 3 is a longitudinal section on line 3—3 of Fig. 1;

Fig. 4 is a diagrammatic view of one of my coils prior to its insertion in the motor;

Fig. 5 is a diagrammatic view of one of my coils as connected when in use.

Like characters of reference designate like parts in each of the views.

Figure 1:
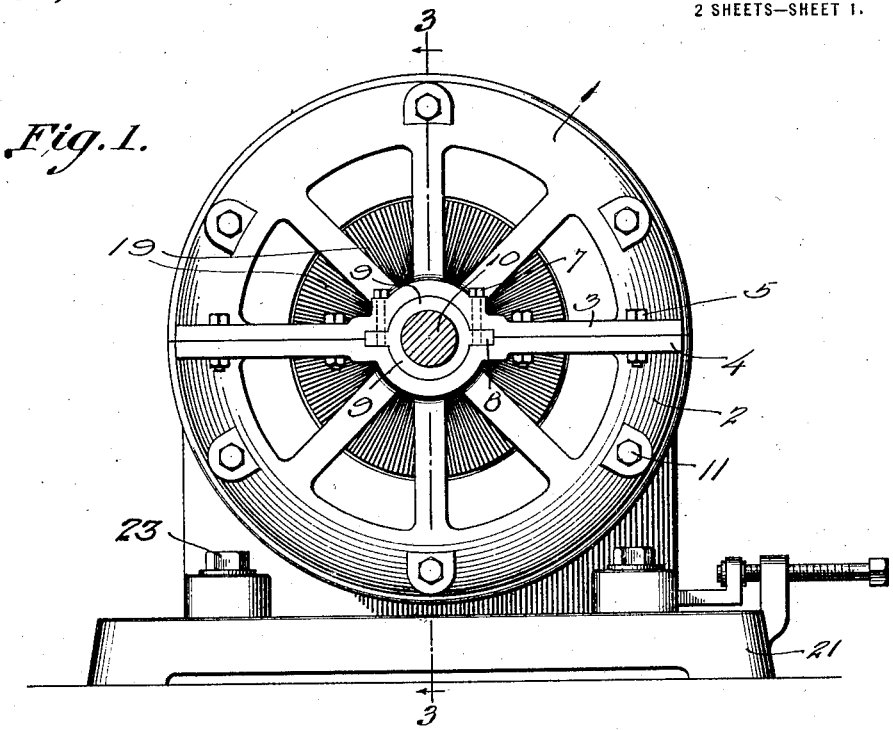
Figure 1 is a side elevation of my motor.

Referring to the accompanying drawings, I provide sectional side frames consisting of an upper half, or section, 1 and a lower half, or section, 2. I provide on section 1 a flange 3, and on section 2 a corresponding flange 4. The sections are fastened together by bolts 5, which extend through the flanges 3 and 4, as shown in Fig. 1. The core or axle 10 of rotor 19 is mounted in suitable bearings contained in a bearings case 9. Bearings case 9 is provided with opposite studs 8. The upper sections 1 of each of the side frames are secured to the bearings case 9 by means of suitable bolts 7 which engage bearing studs 8 as illustrated in Fig. 1. Suitable bolts 11 secure the two sections of the side frames to the central casing 20 of the motor.

By reason of this novel construction of side frames, I am enabled to remove either section to obtain access to a desired coil without removing the entire side frame or dismantling the motor.

Figure 2:
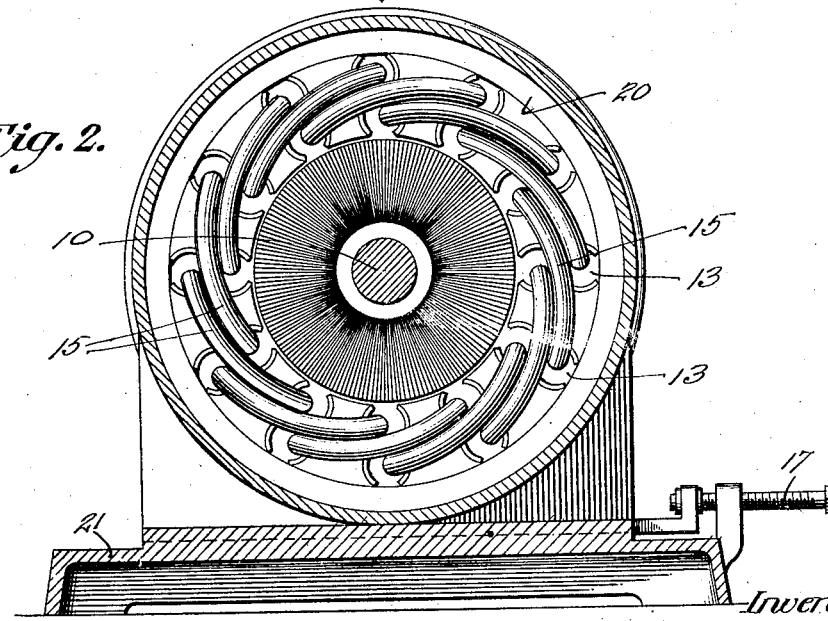
Fig. 2 is a transverse section on line 2—2 of Fig. 3.

To facilitate the changing of coils without the necessity of dismantling the entire motor when a coil needs replacing, I provide in central casing 20 suitable 8-shaped slotted portions 13 into which coils 16 are inserted. Before being inserted in the motor coils 16 are cut as indicated at A in Fig. 4; and when in position in the motor are connected as indicated at C in Fig. 5. The coils are held in place without tying, by means of the lapped strands 15 which lap over one or more 8-shaped slots as illustrated in Fig. 2. The arrangement of the coils, as illustrated prevents their vibrating, the top coil holding the middle coil, and the middle coil holding the bottom from vibrating, and the lapping portions binding the coils in place lightly. The motor casing 20 is adjustable on base 21 by means of a suitable adjusting screw 17.

An important advantage is attained by my sectional side frames in that either the upper or the lower section may be removed without disturbing the other section. A further advantage is attained by my arrangement of coils in that any particular coil which is burned out can be taken out and replaced by a fresh coil without dismantling the entire motor.

By following this procedure the horse-power of the motor is not reduced, and it will not take much longer to put in a new coil than to cut it out of the circuit as has heretofore been done and thereby reducing the horse-power just that much. My construction obviates unnecessary rewinding of the motor.

The coils can be made of wire or copper bars and as many convolutions of wire as will go in the slots properly. They may be lapped between as many of the 8-shaped slots as desired, but preferably as shown in Fig. 2. The purpose of this lapping between slots is simply to bind the coils in place without the necessity of tying them down. The electrical operation is the same as in other motors.

It is further within my contemplation to provide two bolts 23, oppositely disposed on the base 21, to hold the device more securely.

What I claim is:

1. A mounting for an electric motor, comprising a central casing; side frames, each consisting of an upper section and a lower section; bearings for the rotor, the bearings cases having opposite studs; and fastening means securing the upper side frame sections to the studs, whereby either section of the side frames may readily be removed independently of the other to permit of access to the interior of the motor.

2. In an electric motor the combination of a central casing having 8-shaped slotted portions therein, coils adapted to be readily removed when severed, mounted in each of the slotted portions, the coils being mounted with the end connecting portions thereof extending across intervening slotted portions, whereby to bind the intermediate wiring in its place by such connecting portions without its being tied in place by other means.

HERVEY HENTZELL.